US012362917B2

(12) United States Patent
Sabbu

(10) Patent No.: US 12,362,917 B2
(45) Date of Patent: Jul. 15, 2025

(54) METHODS, SYSTEMS AND COMPUTER PROGRAM PRODUCTS FOR SECURE ENCRYPTION OF DATA FOR TRANSMISSION VIA AN UNTRUSTED INTERMEDIARY

(71) Applicant: EPIFI TECHNOLOGIES PRIVATE LIMITED, Karnataka (IN)

(72) Inventor: Pruthvi Sabbu, Karnataka (IN)

(73) Assignee: EPIFI TECHNOLOGIES PRIVATE LIMITED, Marathahalli (IN)

( * ) Notice: Subject to any disclaimer, the term of this patent is extended or adjusted under 35 U.S.C. 154(b) by 405 days.

(21) Appl. No.: 17/691,796

(22) Filed: Mar. 10, 2022

(65) Prior Publication Data

US 2022/0294610 A1   Sep. 15, 2022

(30) Foreign Application Priority Data

Mar. 10, 2021  (IN) .............................. 202141010122

(51) Int. Cl.
*H04L 9/08* (2006.01)
*H04L 9/32* (2006.01)
(Continued)

(52) U.S. Cl.
CPC ............ *H04L 9/0825* (2013.01); *H04L 9/085* (2013.01); *H04L 9/0861* (2013.01);
(Continued)

(58) Field of Classification Search
None
See application file for complete search history.

(56) References Cited

U.S. PATENT DOCUMENTS 5,838,792 A * 11/1998 Ganesan ............. H04L 63/0823
380/282
2004/0034776 A1 * 2/2004 Fernando ................ H04L 9/321
713/171
(Continued)

FOREIGN PATENT DOCUMENTS

AU       2019100775 A4      8/2019
CN       105095696 A   * 11/2015   ........... G06F 21/126
(Continued)

OTHER PUBLICATIONS

ISR Search Report for PCT/IB2022/052142, dated Jun. 20, 2022 (2 pages).
(Continued)

*Primary Examiner* — Ali H. Cheema
(74) *Attorney, Agent, or Firm* — NYEMASTER GOODE P.C.

(57) ABSTRACT

The invention is directed toward systems, methods and computer program products that enable end to end user authentication along with encryption to mitigate the risks posed by untrusted or unsecure intermediary entities. The invention (i) enables full end to end encryption of sensitive data that has been input by a user on a terminal device at one end, and the intended or authorized recipient at the other end, (ii) ensures that data entered by the user on the terminal device is not readable by any intermediary entity including a partner application or other software application implemented within the terminal device, and (iii) eliminates the risk of successful local attacks on the terminal device to unauthorizedly access user data, or to unauthorizedly obtain access to encryption/decryption keys that can be used to unauthorizedly access encrypted user data.

18 Claims, 7 Drawing Sheets

(51) Int. Cl.
*H04L 9/14* (2006.01)
*H04L 9/40* (2022.01)

(52) U.S. Cl.
CPC .......... *H04L 9/3236* (2013.01); *H04L 9/3247* (2013.01); *H04L 9/14* (2013.01); *H04L 9/40* (2022.05); *H04L 63/0435* (2013.01); *H04L 63/0442* (2013.01)

(56) References Cited

U.S. PATENT DOCUMENTS

| | | | | |
|---|---|---|---|---|
| 2011/0066855 | A1* | 3/2011 | Zeng | H04L 63/0869 713/168 |
| 2012/0331088 | A1* | 12/2012 | O'Hare | H04L 67/1097 709/214 |
| 2015/0229621 | A1* | 8/2015 | Kariman | H04L 9/0656 713/168 |
| 2015/0244520 | A1* | 8/2015 | Kariman | H04L 9/0656 713/168 |
| 2015/0280911 | A1* | 10/2015 | Andoni | H04L 9/3234 713/168 |
| 2016/0048684 | A1* | 2/2016 | Kocher | G06F 12/1408 713/2 |
| 2016/0269176 | A1* | 9/2016 | Pang | H04L 9/083 |
| 2017/0103217 | A1* | 4/2017 | Arasu | H04L 9/0819 |
| 2018/0331824 | A1* | 11/2018 | Racz | H04L 9/065 |
| 2018/0337782 | A1* | 11/2018 | Wu | H04L 9/32 |
| 2018/0343115 | A1* | 11/2018 | Chen | H04L 9/0825 |
| 2019/0312878 | A1* | 10/2019 | Brown | H04L 63/045 |
| 2020/0125772 | A1* | 4/2020 | Volos | H04L 9/3265 |
| 2020/0267547 | A1* | 8/2020 | Tal | H04B 1/713 |
| 2020/0344218 | A1* | 10/2020 | Mulayin | H04L 63/0807 |
| 2021/0067328 | A1* | 3/2021 | Verheyen | H04L 63/0442 |
| 2021/0342492 | A1* | 11/2021 | Volos | G06F 21/53 |
| 2022/0092207 | A1* | 3/2022 | Ozaki | H04L 9/0625 |

FOREIGN PATENT DOCUMENTS

| | | | | |
|---|---|---|---|---|
| CN | 106797311 | A * | 5/2017 | ........... H04L 63/061 |
| CN | 110580951 | A * | 12/2019 | ........... A61B 5/1116 |
| CN | 110600109 | A * | 12/2019 | ........... G16H 30/40 |
| CN | 109756582 | B * | 8/2022 | |
| JP | 2003092565 | A * | 3/2003 | ........... G06Q 20/341 |
| JP | 2017092677 | A * | 5/2017 | |
| WO | WO-0178491 | A2 * | 10/2001 | ........... H04L 63/045 |

OTHER PUBLICATIONS

International Preliminary Report on Patentability for PCT/IB2022/052142, dated Dec. 9, 2023 (7 pages).

* cited by examiner

METHODS, SYSTEMS AND COMPUTER PROGRAM PRODUCTS FOR SECURE ENCRYPTION OF DATA FOR TRANSMISSION VIA AN UNTRUSTED INTERMEDIARY

CROSS-REFERENCE TO RELATED APPLICATIONS

This application claims the benefit of priority to Indian Patent Application No. 202141010122, filed Mar. 10, 2021, the entire disclosure of which is incorporated herein by reference in its entirety.

FIELD OF THE INVENTION

The invention relates to the domain of data security and data encryption. In particular, the invention provides methods, systems and computer programs for secure encryption of data that is intended for transmission between two end points through one or more untrusted or unsecure intermediaries.

BACKGROUND

User authentication is a key requirement for secure banking applications. A traditional transaction involves multiple parties besides the end user and bank e.g., payment gateways through which sensitive information such as credentials, PIN, card holder data is passed. This process requires implicit trust by the user and bank on all other parties involved. Parties here may or may not have commercial partnership with the bank. For example, today cardholder data can be entered at a merchant terminal/merchant website/payment gateway site/merchant software application. In such cases the merchant or payment gateway has to undergo strict PCI-DSS checks—which serves to ensure transaction security and reduces or eliminates the likelihood of payment card fraud. Similarly, for debit/ATM PIN based transaction, either the issuer bank needs to trust the payment gateway/merchant or the user needs to be redirected to a separate page hosted by the issuer bank which results in bad user experience and transaction failures due to connectivity and other issues, etc.

In other words, electronic transaction implementation routinely requires sensitive user data to pass through one or more unsecure or untrusted intermediary entities en route to an intended secure destination (e.g. a payment gateway, or a payment network, or an acquirer bank or issuer bank).

An example of a routine instance where sensitive user data is transmitted through one or more untrusted intermediaries is illustrated within FIG. 1. The system environment 100 of FIG. 1 comprises a financial entity 102, a communication network such as the internet 104, a payment gateway 106, and a user's mobile device 108. The mobile device 108 has installed or implemented therewithin, a partner application 110 comprising a software application published by financial entity 102 and which enables a user to interface with financial entity 102 through mobile device 108 for the purposes of carrying out a financial transaction.

From the user's perspective, either one of the partner application 110 or the payment gateway 106 may be an untrusted or unsecure intermediary entity—and exposing the user's sensitive data (such as a payment account number or PIN) to either of these entities in an unsecure manner exposes the user's data to the risk of misappropriation and misuse.

While asymmetric cryptography based solutions present options for encrypting and decrypting data at the mobile device 108 and at the financial entity 108, such asymmetric cryptography based solutions require each entity to store its own cryptographic private key for decrypting data that has been encrypted at the other end using such entity's cryptographic public key. Over time, the stored cryptographic private key is also exposed to risk of misappropriation by unsecured entities (such as partner application 110) that are installed on mobile device 108.

There is accordingly a need for solutions that enable secure encryption and transmission between two end points through one or more untrusted or unsecure intermediaries, which simultaneously addresses the risks of unauthorized decryption and access of such data by the intermediary entities.

In particular, there is a need for:
enabling full end to end encryption of sensitive data that has been input by a user on a terminal device (e.g. a mobile device) at one end, and the intended or authorized recipient at the other end (e.g. a bank).
Ensuring that data entered by the user on the terminal device should not be readable by any intermediary entity including a partner application or other software application implemented within the terminal device.
eliminating the risk of successful local attacks on the terminal device to unauthorizedly access user data, or to unauthorizedly obtain access to encryption/decryption keys that can be used to unauthorizedly access encrypted user data.

BRIEF DESCRIPTION OF THE ACCOMPANYING DRAWINGS

SUMMARY

Figure 1:
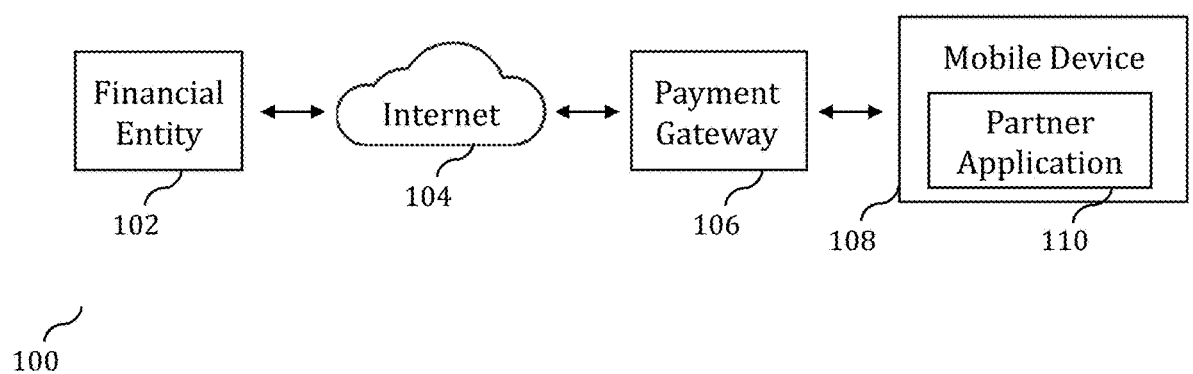
FIG. 1 illustrates a routine instance where sensitive user data is transmitted through one or more untrusted intermediaries.

The invention provides methods, systems and computer programs for secure encryption of data that is intended for transmission between two end points through one or more untrusted or unsecure intermediaries.

The invention provides a method for implementing encrypted network data transmission. The method comprises performing at a processor implemented secure entity within a terminal device, the steps of (i) receiving a request for initiating transmission of data to an authorized recipient, (ii) encrypting at least a cryptographic first handshake key with a cryptographic first public key associated with the authorized recipient, (iii) transmitting the encrypted cryptographic first handshake key to the authorized recipient through an untrusted intermediary, (iv) receiving an encrypted cryptographic secure entity key generated and transmitted by the authorized recipient, wherein generation of the encrypted cryptographic secure entity key comprises performing at the authorized recipient, the steps of (a) receiving the encrypted cryptographic first handshake key, (b) decrypting the encrypted cryptographic first handshake key with a cryptographic first private key associated with the authorized recipient, wherein the cryptographic first public key and the cryptographic first private key comprise a cryptographic first asymmetric key pair, and (c) encrypting a cryptographic secure entity key with the cryptographic first handshake key to generate the encrypted cryptographic secure entity key, (v) decrypting the encrypted cryptographic secure entity key with the cryptographic first handshake key, (vi) generating a cryptographic transaction key, wherein the cryptographic transaction key is generated based on (d) a shared secret key generation process, and (e) a cryptographic second private key associated with the secure entity, (vii) encrypting session data with the generated cryptographic transaction key, and (viii) transmitting the encrypted session data and a cryptographic second public key associated with the secure entity to the authorized recipient through the untrusted intermediary, wherein the cryptographic second private key and the cryptographic second public key comprise a cryptographic second asymmetric key pair.

In an embodiment of this method, the authorized recipient is configured for (i) receiving the encrypted session data and the cryptographic second public key, (ii) generating the cryptographic transaction key, wherein generating the cryptographic transaction key is based on (a) the shared secret key generation process, and (b) the cryptographic second public key, (iii) and decrypting the received encrypted session data with the cryptographic transaction key.

In a further embodiment of the method the secure entity (i) receives encrypted session data that (a) has been encrypted by the authorized recipient with the cryptographic transaction key, and (b) has been transmitted to the secure entity through an untrusted intermediary, and (ii) decrypts the encrypted session data received from the authorized recipient with the cryptographic transaction key.

In a further embodiment, the method comprises (i) encrypting at least a cryptographic second handshake key with the cryptographic first public key, (ii) transmitting the encrypted cryptographic second handshake key to the authorized recipient through the untrusted intermediary, wherein the authorized recipient is configured for (a) receiving the encrypted cryptographic second handshake key, (b) decrypting the encrypted cryptographic second handshake key with the cryptographic first private key, and (c) transmitting the cryptographic second handshake key to the untrusted intermediary for storage therein and for signing, encryption or decryption of data messages transmitted between the secure entity and the untrusted intermediary.

The invention also provides a method for encrypting network data transmission, comprising performing at a processor implemented authorized recipient of data, the steps of (i) receiving from a secure entity within a terminal device, an encrypted cryptographic first handshake key, wherein (a) the encrypted cryptographic first handshake key has been generated at the secure entity by encrypting a cryptographic first handshake key with a cryptographic first public key associated with the authorized recipient, and (b) the encrypted cryptographic first handshake key has been transmitted to the authorized recipient from the secure entity through an untrusted intermediary, (ii) decrypting the encrypted cryptographic first handshake key with a cryptographic first private key associated with the authorized recipient, wherein the cryptographic first public key and the cryptographic first private key comprise a cryptographic first asymmetric key pair, (iii) encrypting a cryptographic secure entity key with the cryptographic first handshake key to generate an encrypted cryptographic secure entity key, (iv) transmitting the encrypted cryptographic secure entity key to the secure entity, (v) receiving from the secure entity, encrypted session data and a cryptographic second public key associated with the secure entity through the untrusted intermediary, wherein (c) the secure entity has (1) decrypted the encrypted cryptographic secure entity key with the cryptographic first handshake key, (2) generated a cryptographic transaction key, wherein the cryptographic transaction key is generated based on a shared secret key generation process, and a cryptographic second private key associated with the secure entity, and (3) encrypted session data with the generated cryptographic transaction key, and (d) the cryptographic second private key and the cryptographic second public key comprise a cryptographic second asymmetric key pair.

In an embodiment of this method, the authorized recipient performs the steps of (i) generating the cryptographic transaction key, wherein generating the cryptographic transaction key is based on (a) the shared secret key generation process, and (b) the cryptographic second public key, and (ii) decrypting the received encrypted session data with the cryptographic transaction key.

In another embodiment of the method, the secure entity (i) receives encrypted session data that (a) has been encrypted by the authorized recipient with the cryptographic transaction key, and (b) has been transmitted to the secure entity through an untrusted intermediary, and (ii) decrypts the encrypted session data received from the authorized recipient with the cryptographic transaction key.

In a further embodiment, this method comprises (i) receiving from the secure entity, an encrypted cryptographic second handshake key that has been encrypted with the cryptographic first public key, (ii) decrypting the encrypted cryptographic second handshake key with the cryptographic first private key, and (iii) transmitting the cryptographic second handshake key to the untrusted intermediary for storage therein and for signing, encryption or decryption of data messages transmitted between the secure entity and the untrusted intermediary.

The invention additionally provides a system for implementing encrypted network data transmission. The system comprises a processor implemented secure entity within a terminal device, wherein the processor implemented secure entity is configured to perform the steps of (i) receiving a request for initiating transmission of data to an authorized recipient, (ii) encrypting at least a cryptographic first handshake key with a cryptographic first public key associated with the authorized recipient, (iii) transmitting the encrypted cryptographic first handshake key to the authorized recipient through an untrusted intermediary, (iv) receiving an encrypted cryptographic secure entity key generated and transmitted by the authorized recipient, wherein generation of the encrypted cryptographic secure entity key comprises performing at the authorized recipient, the steps of (a) receiving the encrypted cryptographic first handshake key, (b) decrypting the encrypted cryptographic first handshake key with a cryptographic first private key associated with the authorized recipient, wherein the cryptographic first public key and the cryptographic first private key comprise a cryptographic first asymmetric key pair, and (c) encrypting a cryptographic secure entity key with the cryptographic first handshake key to generate the encrypted cryptographic secure entity key, (v) decrypting the encrypted cryptographic secure entity key with the cryptographic first handshake key, (vi) generating a cryptographic transaction key, wherein the cryptographic transaction key is generated based on (d) a shared secret key generation process, and (e) a cryptographic second private key associated with the secure entity, (vii) encrypting session data with the generated cryptographic transaction key, and (viii) transmitting the encrypted session data and a cryptographic second public key associated with the secure entity to the authorized recipient through the untrusted intermediary, wherein the cryptographic second private key and the cryptographic second public key comprise a cryptographic second asymmetric key pair.

In an embodiment of the system, the authorized recipient is configured for (i) receiving the encrypted session data and the cryptographic second public key, (ii) generating the cryptographic transaction key, wherein generating the cryptographic transaction key is based on (a) the shared secret key generation process, and (b) the cryptographic second public key, (iii) and decrypting the received encrypted session data with the cryptographic transaction key.

In a further embodiment of the system, the secure entity is configured for (i) receiving the encrypted session data and the cryptographic second public key, (ii) generating the cryptographic transaction key, wherein generating the cryptographic transaction key is based on (a) the shared secret key generation process, and (b) the cryptographic second public key, (iii) and decrypting the received encrypted session data with the cryptographic transaction key.

In a particular embodiment of the system, the processor implemented secure entity is configured for (i) encrypting at least a cryptographic second handshake key with the cryptographic first public key, (ii) transmitting the encrypted cryptographic second handshake key to the authorized recipient through the untrusted intermediary, wherein the authorized recipient is configured for (a) receiving the encrypted cryptographic second handshake key, (b) decrypting the encrypted cryptographic second handshake key with the cryptographic first private key, and (c) transmitting the cryptographic second handshake key to the untrusted intermediary for storage therein and for signing, encryption or decryption of data messages transmitted between the secure entity and the untrusted intermediary.

The invention also provides a system for implementing encrypted network data transmission, comprising a processor implemented authorized recipient of data. The processor implemented authorized recipient of data is configured to perform the steps of (i) receiving from a secure entity within a terminal device, an encrypted cryptographic first handshake key, wherein (a) the encrypted cryptographic first handshake key has been generated at the secure entity by encrypting a cryptographic first handshake key with a cryptographic first public key associated with the authorized recipient, and (b) the encrypted cryptographic first handshake key has been transmitted to the authorized recipient from the secure entity through an untrusted intermediary, (ii) decrypting the encrypted cryptographic first handshake key with a cryptographic first private key associated with the authorized recipient, wherein the cryptographic first public key and the cryptographic first private key comprise a cryptographic first asymmetric key pair, (iii) encrypting a cryptographic secure entity key with the cryptographic first handshake key to generate an encrypted cryptographic secure entity key, (iv) transmitting the encrypted cryptographic secure entity key to the secure entity, (v) receiving from the secure entity, encrypted session data and a cryptographic second public key associated with the secure entity through the untrusted intermediary, wherein (c) the secure entity has (1) decrypted the encrypted cryptographic secure entity key with the cryptographic first handshake key, (2) generated a cryptographic transaction key, wherein the cryptographic transaction key is generated based on a shared secret key generation process, and a cryptographic second private key associated with the secure entity, and (3) encrypted session data with the generated cryptographic transaction key, and (d) the cryptographic second private key and the cryptographic second public key comprise a cryptographic second asymmetric key pair.

In an embodiment of the system, the authorized recipient is configured to perform the steps of (i) generating the cryptographic transaction key, wherein generating the cryptographic transaction key is based on (a) the shared secret key generation process, and (b) the cryptographic second public key, and (ii) decrypting the received encrypted session data with the cryptographic transaction key.

In another embodiment of the system, the secure entity is configured to (i) receive encrypted session data that (a) has been encrypted by the authorized recipient with the cryptographic transaction key, and (b) has been transmitted to the secure entity through an untrusted intermediary, and (ii) decrypts the encrypted session data received from the authorized recipient with the cryptographic transaction key.

In a further embodiment of the system, the authorized recipient is configured to perform the steps of (i) receiving from the secure entity, an encrypted cryptographic second handshake key that has been encrypted with the cryptographic first public key, (ii) decrypting the encrypted cryptographic second handshake key with the cryptographic first private key, and (iii) transmitting the cryptographic second handshake key to the untrusted intermediary for storage therein and for signing, encryption or decryption of data messages transmitted between the secure entity and the untrusted intermediary.

The invention provides a computer program product for implementing encrypted network data transmission. The computer program product comprises a non-transitory computer readable medium having a computer readable program code embodied therein, the computer readable program code comprising instructions for performing at a processor implemented secure entity within a terminal device, the steps of (i) receiving a request for initiating transmission of data to an authorized recipient, (ii) encrypting at least a cryptographic first handshake key with a cryptographic first public key associated with the authorized recipient, (iii) transmitting the encrypted cryptographic first handshake key to the authorized recipient through an untrusted intermediary, (iv) receiving an encrypted cryptographic secure entity key generated and transmitted by the authorized recipient, wherein generation of the encrypted cryptographic secure entity key comprises performing at the authorized recipient, the steps of (a) receiving the encrypted cryptographic first handshake key, (b) decrypting the encrypted cryptographic first handshake key with a cryptographic first private key associated with the authorized recipient, wherein the cryptographic first public key and the cryptographic first private key comprise a cryptographic first asymmetric key pair, and (c) encrypting a cryptographic secure entity key with the cryptographic first handshake key to generate the encrypted cryptographic secure entity key, (v) decrypting the encrypted cryptographic secure entity key with the cryptographic first handshake key, (vi) generating a cryptographic transaction key, wherein the cryptographic transaction key is generated based on (d) a shared secret key generation process, and (e) a cryptographic second private key associated with the secure entity, (vii) encrypting session data with the generated cryptographic transaction key, and (viii) transmitting the encrypted session data and a cryptographic second public key associated with the secure entity to the authorized recipient through the untrusted intermediary, wherein the cryptographic second private key and the cryptographic second public key comprise a cryptographic second asymmetric key pair.

The invention also provides another computer program product for implementing encrypted network data transmission. The computer program product comprises a non-transitory computer readable medium having a computer readable program code embodied therein, the computer readable program code comprising instructions for performing at a processor implemented authorized recipient of data, the steps of (i) receiving from a secure entity within a terminal device, an encrypted cryptographic first handshake key, wherein (a) the encrypted cryptographic first handshake key has been generated at the secure entity by encrypting a cryptographic first handshake key with a cryptographic first public key associated with the authorized recipient, and (b) the encrypted cryptographic first handshake key has been transmitted to the authorized recipient from the secure entity through an untrusted intermediary, (ii) decrypting the encrypted cryptographic first handshake key with a cryptographic first private key associated with the authorized recipient, wherein the cryptographic first public key and the cryptographic first private key comprise a cryptographic first asymmetric key pair, (iii) encrypting a cryptographic secure entity key with the cryptographic first handshake key to generate an encrypted cryptographic secure entity key, (iv) transmitting the encrypted cryptographic secure entity key to the secure entity, (v) receiving from the secure entity, encrypted session data and a cryptographic second public key associated with the secure entity through the untrusted intermediary, wherein (c) the secure entity has (1) decrypted the encrypted cryptographic secure entity key with the cryptographic first handshake key, (2) generated a cryptographic transaction key, wherein the cryptographic transaction key is generated based on a shared secret key generation process, and a cryptographic second private key associated with the secure entity, and (3) encrypted session data with the generated cryptographic transaction key, and (d) the cryptographic second private key and the cryptographic second public key comprise a cryptographic second asymmetric key pair.

DETAILED DESCRIPTION

For the purposes of the following written description, explanations are provided for the below terms:
"DH"—the term "DH" shall be understood as an abbreviation of "Diffie Hellman" and wherever used shall be understood as a reference to the Elliptic curve Diffie Hellman Key Exchange protocol
"ECDH"—the term "ECHD" shall refer to the Elliptic curve Diffie Hellman Key Exchange protocol
"ECIES"—the term "ECIES" shall refer to the Elliptic Curve Integrated Encryption Scheme
"SIDH"—the term "SIDH" shall refer to the Supersingular isogeny key exchange protocol
"IKE"—the term "IKE" shall refer to the Internet Key Exchange protocol
"JFK"—the term "JFK" shall refer to the Just Fast Keying protocol
"SDK"—the term "SDK" shall refer to a software development kit (i.e. a set of software tools or library files) that is configured in accordance with the teachings of the present invention. The SDK is configured to (i) provide a user interface within a mobile device or terminal device (which for the purposes of this invention may include any processor based device, including a handheld ATM, a point-of-sale device, computer, laptop, desktop, server, client device, tablet or personal digital assistant) through which a user can input sensitive data, and/or can view sensitive data received from a financial entity (ii) implement one or more encryption functions on sensitive data received from a user, (iii) forward encrypted data to an intermediary entity (such as a partner software application implemented within the mobile device/terminal device) for onward transmission to an intended destination, and (iv) receive encrypted data from an intermediary entity (such as a partner software application implemented within the mobile device/terminal device) and decrypt such data for processing or presentation to a user.
"Shared secret"—the term "shared secret" shall be understood as a data item or data value that is known to two parties to a transaction. When implementing the ECDH, a shared secret can be computed by both parties without one party having to share or exchange said shared secret with the other.

As discussed in more detail below, the claimed invention is directed towards, systems, methods and computer program products that enable end to end user authentication along with encryption to mitigate the risks posed by untrusted or unsecure intermediary entities. The invention establishes security guarantees by:
  establishing of a non-tamperable trusted end-to-end channel between an initiator of a transmission (for example, a user) of sensitive data (e.g. a personal identification number, password, one-time-password, cardholder data, etc.) atone end (for example at a terminal device/mobile device operated by a user) and an intended or authorized recipient of the sensitive data (e.g. a financial entity/bank) at the other end.
  ensuring that any transmission intermediaries involved in transmitting the data along the trusted end-to-end channel are unable to decrypt or access the sensitive data.
  generating a distinct or unique encryption channel (i.e. based on a distinct set of encryption/decryption keys) per user, instead of using a common encryption channel (i.e. based on a common set of encryption/decryption keys) for multiple/all users.
  Enabling generation of a new encryption channel as required (every session, every payment, every 'n' days) depending on the sensitivity of the financial activity. For example, in embodiments where a new encryption channel is generated per session, even if the cryptographic keys corresponding to that session are misappropriated by an untrusted or unsecure entity, the cryptographic keys would change for the next session/payment and as a result, even the misappropriated cryptographic keys would be rendered useless.
  implementing within a user's mobile device/terminal device, an SDK configured according to the teachings of the present invention—wherein the SDK establishes a secure channel between the user's mobile device/terminal device on one end and an authorized recipient of the user's sensitive data (e.g. a bank/financial entity) at the other end. The SDK may be configured to (i) provide a user interface within a mobile device or terminal device through which a user can input sensitive data, and/or can view sensitive data received from a financial entity (ii) implement one or more encryption functions on sensitive data received from a user, (iii)

forward encrypted data to an intermediary entity (such as a partner software application implemented within the mobile device/terminal device) for onward transmission to an authorized recipient, and (iv) receive encrypted data from an intermediary entity (such as a partner software application that is published by a third party and that is implemented within the mobile device/terminal device) and decrypt such data for processing or presentation to a user.

configuring the SDK for one or more of:
- executing within a first process space/memory space within the mobile device/terminal device, that is distinct from a second process space/memory space that is used to execute a partner software application implemented within the mobile device/terminal device (which partner software application is a transmission intermediary between the SDK and the authorized recipient of the SDK's data transmissions)—wherein the first process space/memory space is protected from access by the partner software application, and in which case the SDK and the partner software application may communicate or pass data to each other through inter-process calls (IPC), or
- executing within a process space/memory space within the mobile device/terminal device, that is also used to execute a partner software application implemented within the mobile device/terminal device (which partner software application is a transmission intermediary between the SDK and the authorized recipient of the SDK's data transmissions), or which process space/memory space can be accessed by the partner software application, and in which case, the SDK and the partner software application may communicate or pass data to each other through application programming interface (API) calls, or
- providing a user interface (UI) within a mobile device/terminal device for a user to enter secure data. All sensitive data is captured, encrypted by the SDK, and passed to the calling app (e.g. the partner software application). The partner software application sends this encrypted credential block to the authorized recipient (e.g. the bank/financial entity) over a network. However the SDK may be configured to ensure that no sensitive information is accessible to the partner software application or any other intermediary entity.
- Encrypting data such that it can be decrypted only by the authorized recipient (e.g. the bank/financial entity)—which therefore limits the exposure of sensitive data to just the user on one end and to the authorized recipient (e.g. the bank/financial entity) at the other end. This additionally ensures that updates/modifications to the partner software application doesn't impact the entity responsible for securing the sensitive data (i.e. the SDK).

A high level description of the manner in which the teachings of the present invention may be implemented, is provided below.

In accordance with the teachings of the present invention, the SDK that is installed or implemented within the mobile device/terminal device of the user, is configured to embed cryptographic public key(s) of the authorized recipient (e.g. a bank or financial entity) and will help to establish an end to end secure channel, in the form of encryption, with the financial entity. Optionally, the SDK can also ping the financial entity server with certificate transparency enabled to continuously verify that the cryptographic public keys are still valid.

The SDK is configured to mutually agree on the cryptographic handshake keys (which can be symmetric or asymmetric cryptographic keys) with the authorized recipient at the time of session establishment. One example of mutual agreement is the ECIES hybrid encryption scheme. The communication between the SDK and the authorized recipient is secured by the initial secure channel until the cryptographic handshake keys are established.

The SDK establishes a cryptographic session key (which can be a symmetric or asymmetric cryptographic key) with the authorized recipient where the payload is secured by the cryptographic handshake key and whose integrity is maintained using the authorized recipient's digital signature. In cases where an asymmetric cryptographic key pair is used, the corresponding cryptographic private key can be stored with the authorized recipient, and the cryptographic public key is shared with the SDK—which will be used as a cryptographic session key. While Elliptic curve algorithms are optimal for the use case, other algorithms would also serve the same purpose.

The SDK also establishes a cryptographic session key with the client application (e.g. a financial partner app) during the above process so that any and all the interaction between the client application and the SDK is secured and cannot be tampered with.

Thereafter, for every communication session (for example, for every financial transaction), the SDK generates a cryptographic transaction key. If an elliptic curve algorithm is used, the SDK will generate a new ECDH asymmetric key pair. The new ECDH asymmetric key pair and the cryptographic session key can be used to generate a fresh AES key using ECIES hybrid encryption scheme. The cryptographic session key (in this example a ECDH public key) can be rotated as a response to every financial transaction to provide full PFS or be chosen to rotate at regular intervals based on the level of security that is required.

Further, the SDK may be configured to use a device fingerprint and transaction specific parameters as a salt to guard against replay attacks.

A more detailed description of embodiments of the invention are provided hereinbelow.

It would be understood that a principal objective of the below described embodiments is to enable an SDK or other secure software object(s) or data object(s) that are implemented within a user's mobile device or terminal device, to generate or control a user interface to obtain sensitive data (for example, personal information, a PIN, a password, a passcode, an OTP, financial account information, payment card information, payment account number or payment account information, health information or other sensitive or personal information) from a user and to pass it to a secure partner entity (for example a bank server, financial entity server, or any other server or data processing device that is associated with an authorized recipient of the user data). The objective further includes ensuring that the sensitive data remains protected from misappropriation or decryption despite passing through at least one untrusted intermediary entity (for example a partner software application or any other software application that is published by the intended authorized entity, and which is installed or implemented on the mobile device/terminal device).

Figure 2:
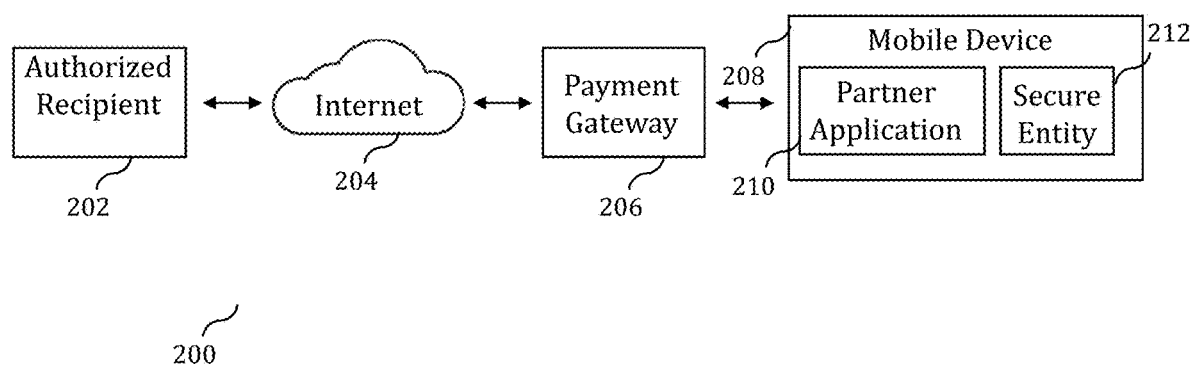
FIG. 2 illustrates a system environment within which one or more embodiments of the present invention may be performed.

FIG. 2 illustrates a system environment 200 within which one or more embodiments of the present invention may be performed. The system environment 200 comprises an authorized recipient 202 (for example, a financial entity/bank), a communication network such as the internet 204, a payment gateway 206, and a user's mobile device/terminal device 208. The mobile device/terminal device 208 has installed or implemented therewithin, a partner application 210 comprising a software application published by the authorized recipient 202 (or published by any other entity) and which enables a user to interface with the authorized recipient 202 through mobile device/terminal device 208 for the purposes of carrying out data communication or a network communication session. The mobile device/terminal device 208 additionally has installed or implemented therewithin, a secure entity/SDK 212 configured according to the teachings of the present invention—wherein the secure entity/SDK is configured to establish a secure channel between the user's mobile device/terminal device on one end and the authorized recipient 202 of the user's sensitive data (e.g. a bank/financial entity) at the other end. The secure entity/SDK 212 may be configured to (i) implement a user interface within the mobile device/terminal device 208 through which a user can input sensitive data, and/or can view sensitive data received from the authorized recipient 202 (ii) implement one or more encryption functions on sensitive data received from a user, (iii) forward encrypted data to an intermediary entity (such as a partner software application 210 implemented within the mobile device/terminal device 208, or a payment gateway 206) for onward transmission to the authorized recipient 202, and (iv) receive encrypted data from the authorized recipient 202 through an intermediary entity (such as the partner software application 210 or the payment gateway 206) and decrypt such data for processing or presentation to a user.

Figure 3A:
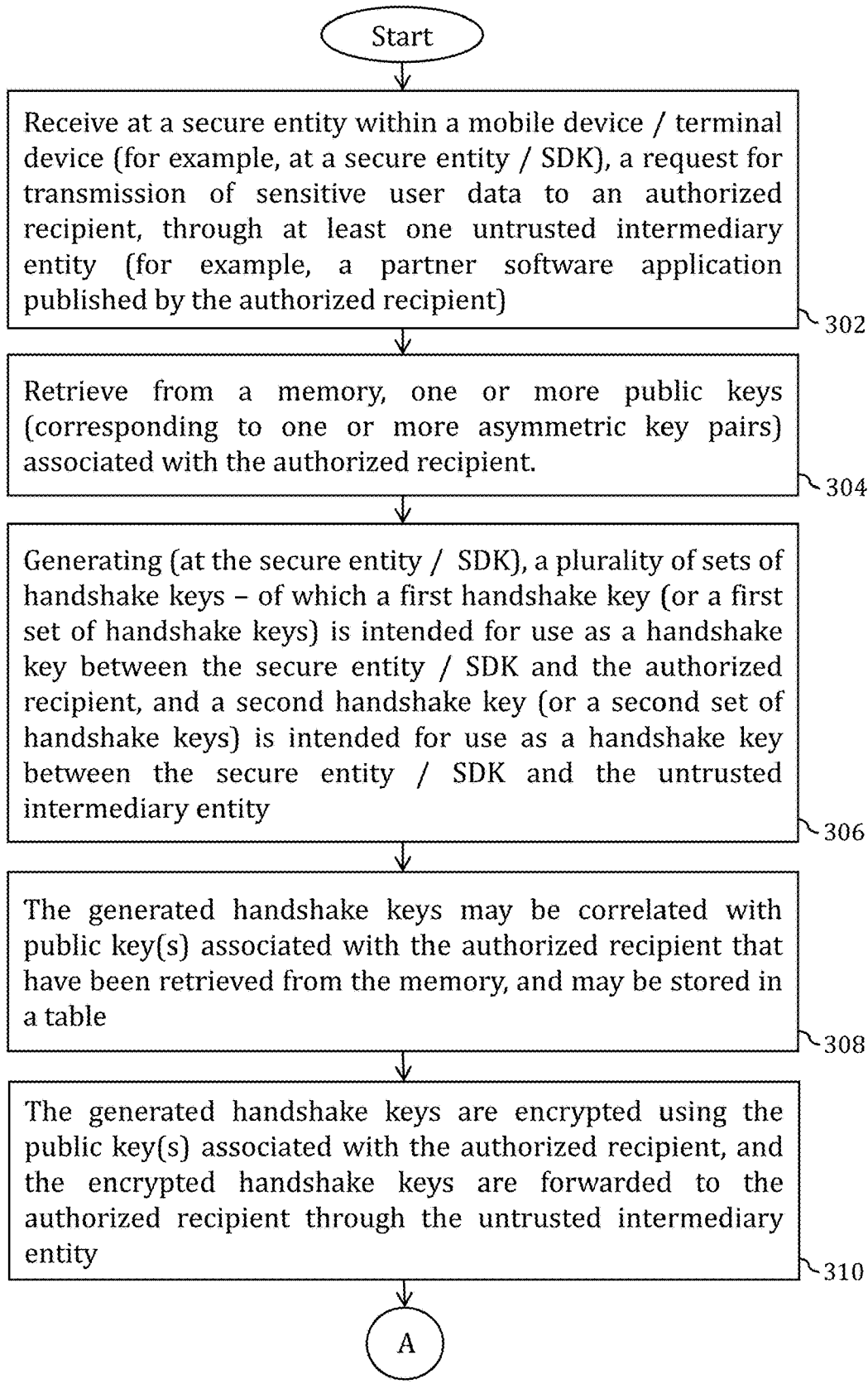
FIGS. 3A to 3C illustrate method steps of the present invention.
Figure 3B:
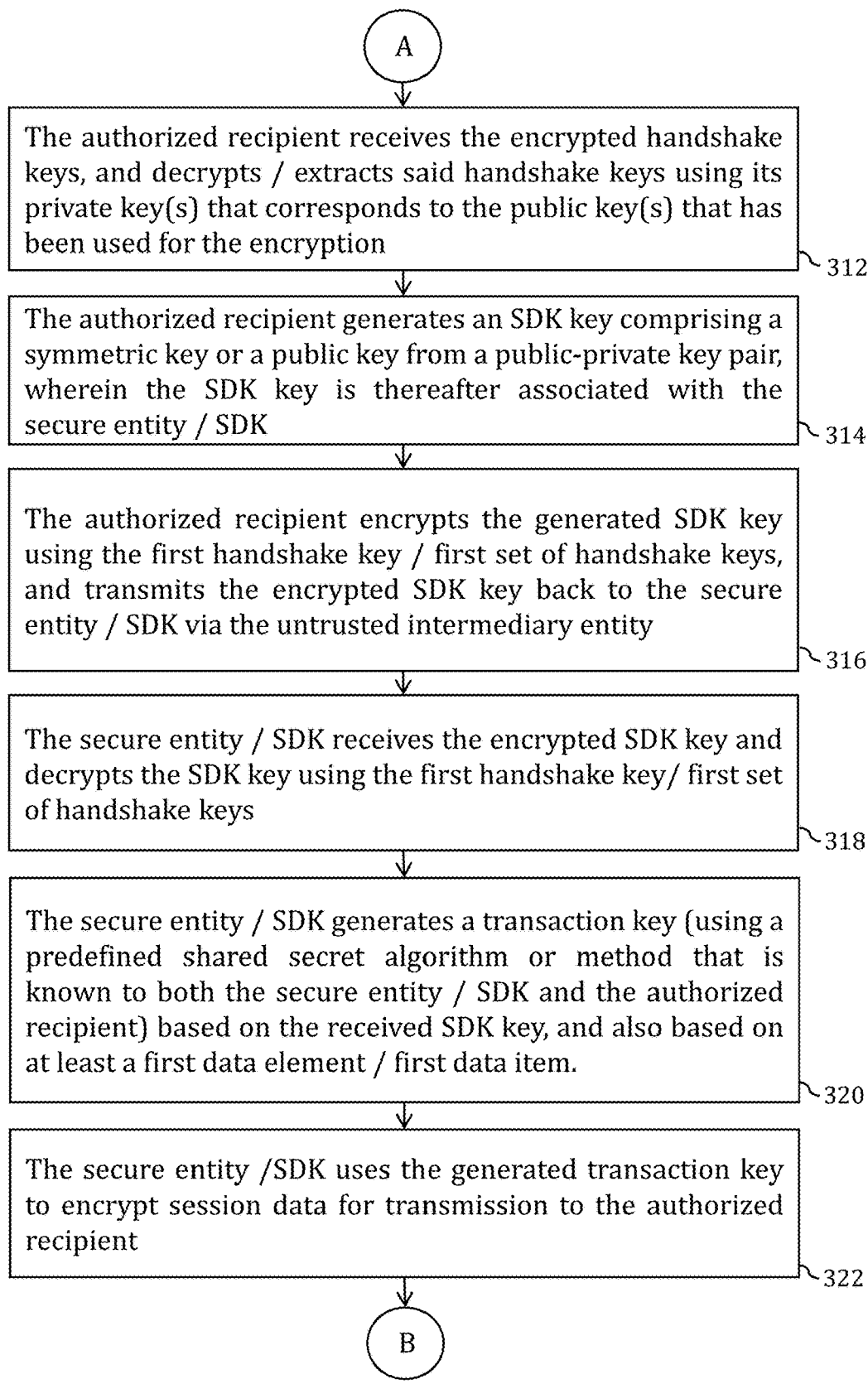
Figure 3C:
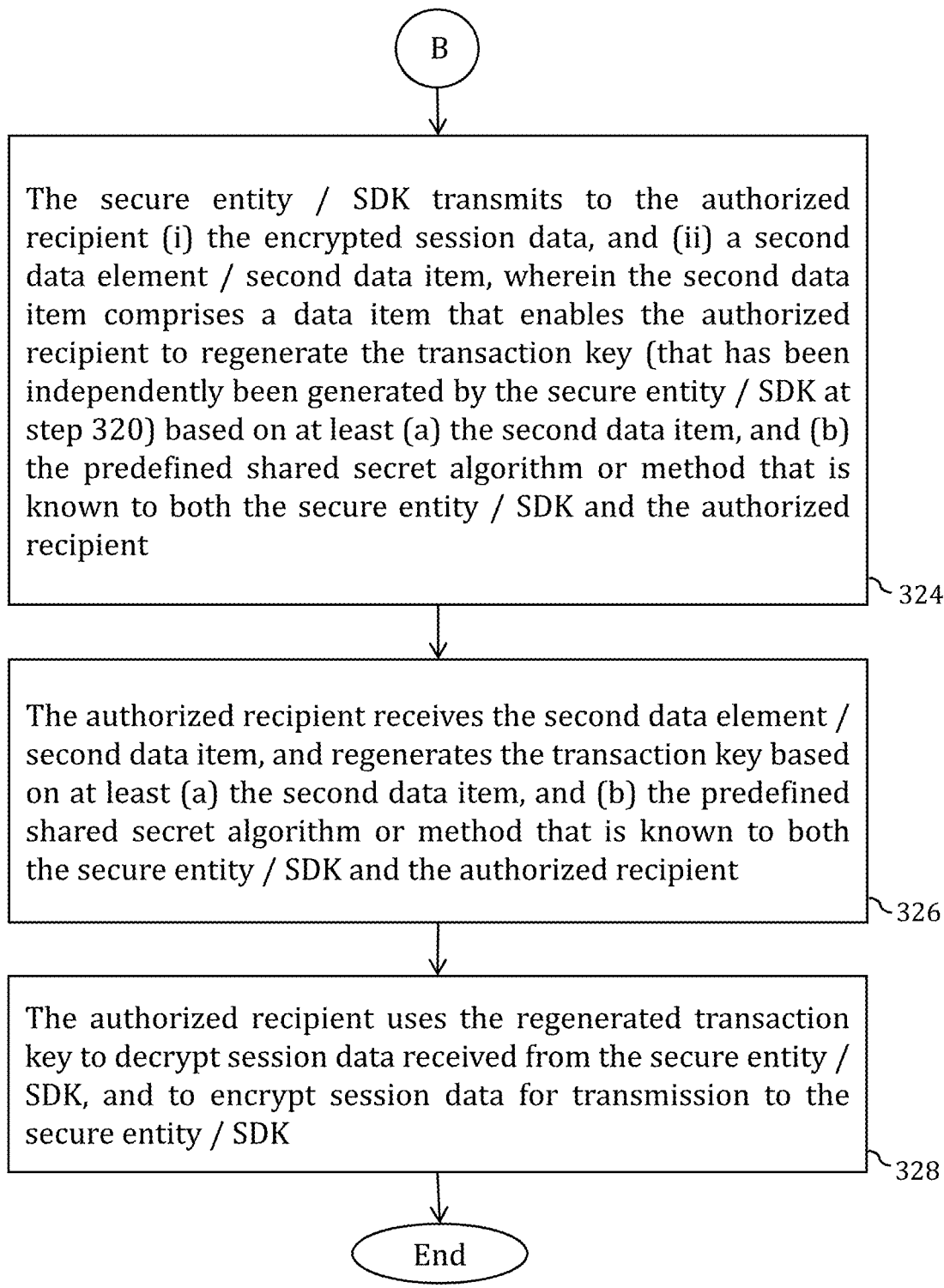

FIGS. 3A to 3C comprise a flowchart illustrating a method according to the teachings of the present invention. It would be understood that the methods of the present invention may be implemented by performing one or more method steps illustrated in FIGS. 3A to 3C—and in one embodiment may be implemented by performing all method steps illustrated in FIGS. 3A to 3C. In an embodiment, one or more of the method steps of FIGS. 3A to 3C may be performed within the system entities illustrated withing the system environment 200 of FIG. 2.

Step 302 comprises receive at a secure entity/SDK within a mobile device/terminal device (for example secure entity 212 within mobile device 208), a request for transmission of sensitive user data to an authorized recipient (e.g. authorized recipient 202), through at least one untrusted intermediary entity (for example, a partner software application 210 published by the authorized recipient 202, or a payment gateway 206 or any intermediate networking entity within a communication network such as internet 204). The request may be received at the secure entity/SDK within an instruction received from partner software application 210 by way of an inter-process communication (IPC) call or by way of an API call.

At step 304, the secure entity/SDK retrieves from a memory, one or more cryptographic public keys (corresponding to one or more asymmetric key pairs) associated with the authorized recipient. In certain embodiments, the secure entity/SDK is provided with access to a plurality of cryptographic public keys associated with the authorized recipient 202. This provides certain advantages including (i) if one of such cryptographic public keys is compromised, the secure entity/SDK can fall back on one of the remaining uncompromised public keys, and (ii) by randomly selecting one of several available cryptographic public keys for generation of encrypted data/handshake keys, step 304 makes it even more difficult to compromise security of the system.

Step 306 comprises generating (at the secure entity/SDK), a plurality of cryptographic handshake keys—of which (i) a cryptographic first handshake key (or a first set of cryptographic handshake keys comprising at least a cryptographic first handshake key) is intended for use as a cryptographic handshake key(s) between the secure entity/SDK and the authorized recipient and (ii) a cryptographic second handshake key (or a second set of cryptographic handshake keys comprising at least a cryptographic second handshake key) is intended for use as a cryptographic handshake key(s) between the secure entity and the untrusted intermediary entity. In an embodiment, each of the cryptographic first and second handshake keys is distinct from the other. In another embodiment, each of the first and second sets of cryptographic handshake keys is distinct from the other.

Each of the cryptographic first handshake key and the cryptographic second handshake key may comprise either a cryptographic symmetric key or a cryptographic asymmetric key pair. While use of symmetric key cryptography can be more efficient, asymmetric cryptography provides advantages in terms of security.

At step 308 the generated cryptographic handshake keys may be (optionally, and at the secure entity/SDK within the mobile device/terminal device) correlated with cryptographic public key(s) associated with the authorized recipient that have been retrieved from the memory, and may be stored in a table that records the correlations.

At step 310 the secure entity/SDK within the mobile device/terminal device encrypts the generated cryptographic handshake key(s) (i.e. the cryptographic first and second handshake keys or the first and second sets of cryptographic handshake keys) using the cryptographic public key(s) associated with the authorized recipient, and the encrypted cryptographic handshake keys are forwarded (through network transmission) to the authorized recipient through one or more untrusted intermediary entities.

Since the untrusted intermediary entities do not have access to the authorized recipient's cryptographic private key(s), they cannot decrypt the transmitted cryptographic handshake keys. In certain embodiments, the number of cryptographic handshake keys transmitted to the authorized recipient can be changed/selectively determined based on a desired security level. For example, where the authorized recipient is sent more than one cryptographic handshake key, one cryptographic handshake key can be randomly selected from among the multiple cryptographic handshake keys received by the authorized recipient for the following steps. The multiple possible combinations and cryptographic keys result in an exponential increase in brute-force efforts required to crack all the keys.

The implementation of steps 302 to 310 described above have the effect of creating an initial end-to-end secure channel of communication between the secure entity/SDK and the authorized recipient, despite the fact that data transmitted over the secure channel has to pass through one or more untrusted entities (such as a partner software application or a payment gateway or any one or more network communication entities).

At step 312, the authorized recipient receives the encrypted cryptographic handshake key(s) (i.e. the encrypted cryptographic first and second handshake keys, or the encrypted first and second sets of cryptographic handshake keys), and decrypts/extracts said cryptographic handshake key(s) using its cryptographic private key(s) that correspond to the cryptographic public key(s) that have been used for the encryption.

At step 314, the authorized recipient generates a cryptographic SDK key/secure entity key—comprising either a cryptographic symmetric key, or a cryptographic public key that is part of a first public-private asymmetric key pair generated by the authorized recipient. The cryptographic SDK key/secure entity key is then associated with the secure entity/SDK.

At step 316 the authorized recipient encrypts the generated cryptographic SDK key/secure entity key using the cryptographic first handshake key/first set of cryptographic handshake keys that have been received from the secure entity/SDK, and transmits the encrypted cryptographic SDK key/secure entity key back to the secure entity/SDK through the one or more untrusted intermediary entities. As a result, the cryptographic SDK key/secure entity key is transmitted back to the secure entity/SDK over a second secure channel of communication established between the authorized recipient and the secure entity/SDK.

The encrypted cryptographic SDK key/secure entity key is opaque to the untrusted intermediary entities that serve as communication intermediates positioned between the authorized recipient and the secure entity/SDK—since such untrusted intermediary entities do not have access to the cryptographic handshake keys that have been used to encrypt the cryptographic SDK key/secure entity key. In other words, step 316 has the effect of creating a second secure channel of communication between the secure entity/SDK and the authorized recipient despite the fact that data transmitted over the secure channel has to pass through one or more untrusted entities.

As an optional step, the authorized recipient may provision one or more of the untrusted intermediary entities with a trust token (for example the cryptographic second handshake key/second set of cryptographic handshake keys) that can be used to establish trust with the secure entity/SDK. For example the authorized recipient can transmit the cryptographic second handshake key/second set of cryptographic handshake keys to the untrusted intermediary for storage therein—and future communications between the secure entity/SDK and the untrusted intermediary can be signed or encrypted using the cryptographic second handshake key/second set of cryptographic handshake keys. Since both of the secure entity/SDK and the untrusted intermediary entity have access to the cryptographic second handshake key/second set of cryptographic handshake keys, each can authenticate or decrypt data that has been signed or encrypted by the other using the cryptographic second handshake key/second set of cryptographic handshake keys. By provisioning an untrusted intermediary entity with a trust token in this manner, the invention enables (if necessary) generation of a secured communication channel between the secure entity/SDK and the untrusted intermediary entity as well.

At step 318 the secure entity/SDK receives the encrypted SDK key/secure entity key (which may in an embodiment comprise a cryptographic public key of a first cryptographic public-private key pair that has been generated by the authorized recipient) and decrypts the cryptographic SDK key/secure entity key using the cryptographic first handshake key/first set of cryptographic handshake keys.

Thereafter at step 320, the secure entity/SDK generates a cryptographic transaction key (using a predefined shared secret algorithm or method that is known to both the secure entity/SDK and the authorized recipient)—wherein generation of the cryptographic transaction key is based on (for example, may use as an input) the cryptographic SDK key/secure entity key (which may in an embodiment comprise a cryptographic public key of a first public-private key pair that has been generated by the authorized recipient) and may additionally be based on (for example, may use as an input) at least a first data element/first data item. In an embodiment, the first data element/first data item comprises a cryptographic private key of a second private-public key pair generated by the secure entity/SDK. In an embodiment the predefined shared secret algorithm may comprise any one or more key exchange algorithms such as the DH algorithm, ECDH algorithm, SIDH algorithm, ECIES algorithm, IKE algorithm or JFK algorithm.

At step 322 the secure entity/SDK uses the generated cryptographic transaction key to encrypt session data for transmission to the authorized recipient. The session data may include any personal or sensitive data that has been received by the secure entity/SDK (for example through a user interface generated or controlled by said secure entity/SDK) for onward secure transmission to an authorized recipient.

At step 324 the secure entity/SDK transmits to the authorized recipient (i) the encrypted session data, and (ii) a second data element/second data item, wherein the second data item comprises a data item that enables the authorized recipient to regenerate the transaction key (that has been independently been generated by the secure entity/SDK at step 320) based on at least (a) the second data item, and (b) the predefined shared secret algorithm or method that is known to both the secure entity/SDK and the authorized recipient. In an embodiment, the second data element/second data item comprises a cryptographic public key of the second private-public key pair generated by the secure entity/SDK.

At step 326 the authorized recipient receives the second data element/second data item, and regenerates the cryptographic transaction key based on at least the second data item and the predefined shared secret algorithm or method that is known to both the secure entity/SDK and the authorized recipient.

In an embodiment, where the SDK key/secure entity key comprises a cryptographic symmetric key, the authorized recipient may additionally rely on said cryptographic symmetric key for regeneration of the cryptographic transaction key. In another embodiment where the cryptographic SDK key/secure entity key comprises a cryptographic public key corresponding to a public-private key pair generated by the authorized recipient, said authorized recipient may additionally rely on the cryptographic private key corresponding to said public key for the purposes of regeneration of the transaction key.

At step 328 the authorized recipient uses the regenerated cryptographic transaction key to decrypt session data received from the secure entity/SDK, and to encrypt session data for transmission to the secure entity/SDK.

Encrypted session data that is received by the secure entity/SDK from the authorized recipient is decrypted by the secure entity/SDK using the cryptographic transaction key.

It would be understood that since none of the other unsecure intermediary entities have access to any of the second data item, the predefined shared secret algorithm or method that is known to both the secure entity/SDK and the authorized recipient, or to the cryptographic SDK key/secure entity key, said unsecure entities would be unable to generate the cryptographic transaction key independently and would therefore be unable to decrypt or misappropriate the encrypted session data transmitted from the secure entity/SDK to the authorized recipient.

Since both of the secure entity/SDK and the authorized recipient are now in secure possession of the cryptographic transaction key, said cryptographic transaction key can be used to encrypt subsequent communications between the two entities within the communication session. This has the effect of creating a third secure channel of communication between the secure entity/SDK and the authorized recipient despite the fact that data transmitted over this third secure channel has to pass through one or more untrusted entities.

In an embodiment, on response of every successful communication or any specific time, the authorized recipient can generate new cryptographic keys for generating a new cryptographic SDK key/secure entity key—which thereafter enables generation of a new cryptographic transaction key.

It would be understood that shared cryptographic SDK key/secure entity keys or cryptographic transaction keys can be periodically refreshed or regenerated based on the data sensitivity of information that is exchanged between the secure entity/SDK and an intended authorized entity. Cryptographic keys can be chosen for single use, or may be limited for use within a certain period.

Figure 4:
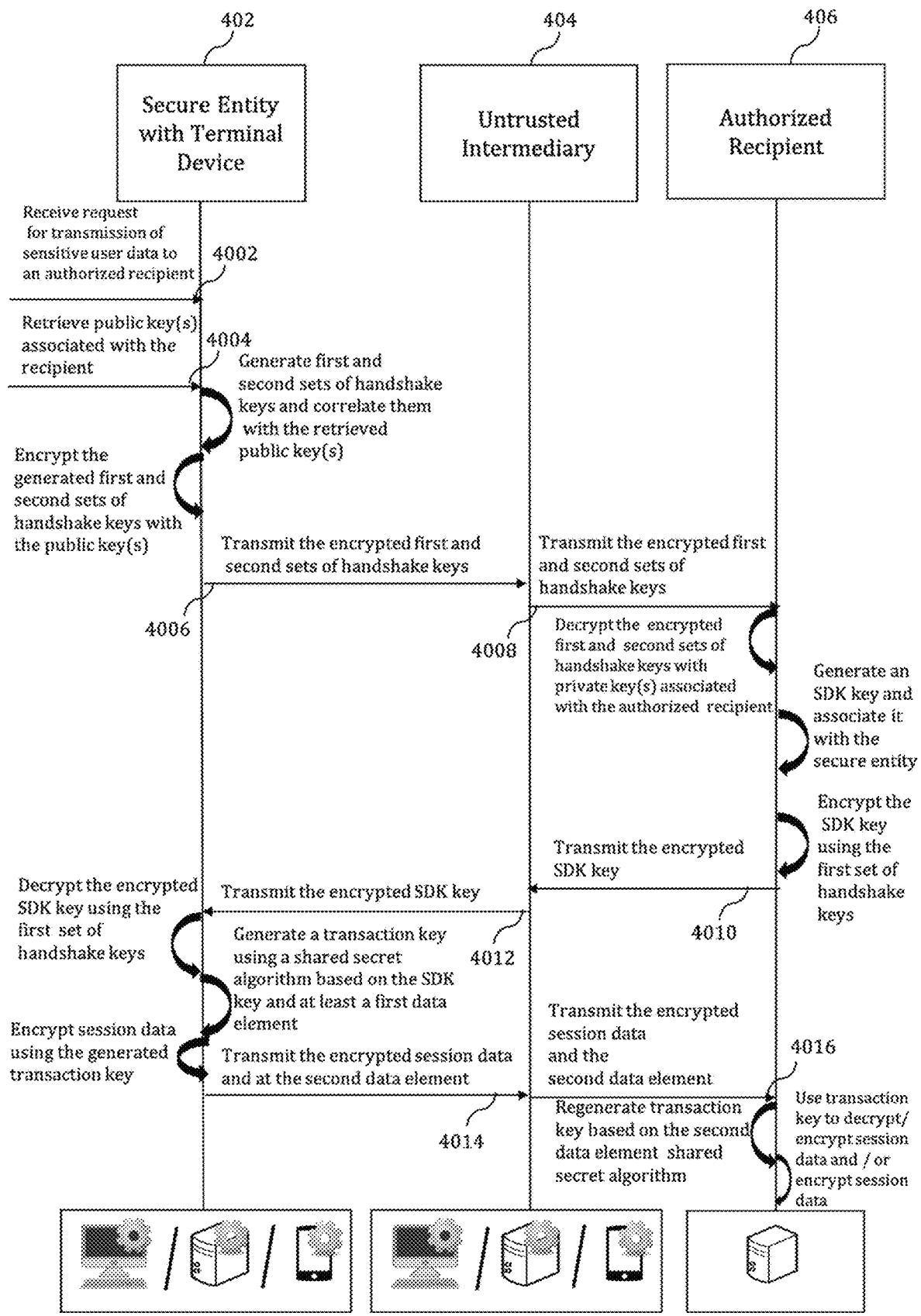
FIG. 4 is a communication flow diagram illustrating communication flow between system entities for implementing the present invention.

FIG. 4 is a communication flow diagram illustrating an exemplary communication flow between system entities when performing the method of FIGS. 3A to 3C.

Step 4002 comprises receiving at a secure entity 402 (e.g. an SDK) within a terminal device/mobile device, a request for transmission of sensitive user data to an authorized recipient 406, through at least one untrusted intermediary 404 (for example, a partner software application published by the authorized recipient 406, or a payment gateway or any intermediate networking entity within a communication network). The request may be received at the secure entity 402 within an instruction received from a partner software application by way of an inter-process communication (IPC) call or by way of an API call.

At step 4004, the secure entity 402 retrieves from a memory, one or more cryptographic public keys (corresponding to one or more cryptographic asymmetric key pairs) associated with the authorized recipient 406. In certain embodiments, the secure entity 402 is provided with access to a plurality of cryptographic public keys associated with the authorized recipient 406. This provides certain advantages including (i) if one of such cryptographic public keys is compromised, the secure entity 402 can fall back on one of the remaining uncompromised cryptographic public keys, and (ii) by randomly selecting one of several available cryptographic public keys for generation of encrypted data/cryptographic handshake keys, step 4004 makes it even more difficult to compromise security of the system.

The security entity 402 generates a plurality of cryptographic handshake keys—of which (i) a cryptographic first handshake key (or a first set of cryptographic handshake keys comprising at least a cryptographic first handshake key) is intended for use as a cryptographic handshake key(s) between the secure entity 402 and the authorized recipient 406 and (ii) a cryptographic second handshake key (or a second set of cryptographic handshake keys comprising at least a cryptographic second handshake key) is intended for use as a cryptographic handshake key(s) between the secure entity 402 and the untrusted intermediary 404. In an embodiment, each of the cryptographic first and second handshake keys is distinct from the other. In another embodiment, each of the first and second sets of cryptographic handshake keys is distinct from the other.

Each of the cryptographic first handshake key and the cryptographic second handshake key may comprise either a cryptographic symmetric key or a cryptographic asymmetric key pair. While use of cryptographic symmetric key cryptography can be more efficient, asymmetric cryptography provides advantages in terms of security.

The generated cryptographic handshake keys may be (optionally, and at the secure entity 402 within the terminal device) correlated with cryptographic public key(s) associated with the authorized recipient 406 that have been retrieved from the memory, and may be stored in a table that records the correlations.

The secure entity 402 within the terminal device encrypts the generated cryptographic handshake key(s) (i.e. the cryptographic first and second handshake keys or the first and second sets of cryptographic handshake keys) using the cryptographic public key(s) associated with the authorized recipient 406. At step 4006 the encrypted cryptographic handshake keys are forwarded (by network transmission) from secure entity 402 to the untrusted intermediary 404, and at step 4008 the untrusted intermediary 404 forwards the encrypted cryptographic handshake keys onward to the authorized recipient 406.

Since the untrusted intermediary entity(ies) 404 does not have access to the authorized recipient's cryptographic private key(s), it cannot decrypt the transmitted cryptographic handshake keys. In certain embodiments, the number of cryptographic handshake keys transmitted to the authorized recipient 406 can be changed/selectively determined based on a desired security level. For example, where the authorized recipient 406 is sent more than one cryptographic handshake key, one cryptographic handshake key can be randomly selected from among the multiple cryptographic handshake keys received by the authorized recipient 406 for the subsequent steps. The multiple possible combinations and cryptographic keys result in an exponential increase in brute-force efforts required to crack all the cryptographic keys.

The implementation of steps described above have the effect of creating an initial end-to-end secure channel of communication between the secure entity 402 and the authorized recipient 406, despite the fact that data transmitted over the secure channel has to pass through one or more untrusted entities 404 (such as a partner software application or a payment gateway or any one or more network communication entities).

The authorized recipient 406 receives the encrypted cryptographic handshake key(s) (i.e. the encrypted cryptographic first and second handshake keys, or the encrypted first and second sets of cryptographic handshake keys), and decrypts/extracts said cryptographic handshake key(s) using its cryptographic private key(s) that correspond to the cryptographic public key(s) that have been used for the encryption.

The authorized recipient 406 generates a cryptographic SDK key/secure entity key—comprising either a cryptographic symmetric key, or a cryptographic public key that is part of a first public-private key pair generated by the authorized recipient. The cryptographic SDK key/secure entity key is then associated with the secure entity 402.

The authorized recipient 406 encrypts the generated cryptographic SDK key/secure entity key using the cryptographic first handshake key/first set of cryptographic handshake keys that have been received from the secure entity 402. At step 4010, the authorized recipient transmits the encrypted cryptographic SDK key/secure entity key to the untrusted intermediary 404. At step 4012 the untrusted intermediary transmits the encrypted cryptographic SDK key/secure entity key onward to the secure entity 402. As a result, the encrypted cryptographic SDK key/secure entity key is transmitted through one or more untrusted intermediary entities 404 back to secure entity 402 over a second secure channel of communication established between the authorized recipient 406 and the secure entity 402.

The encrypted cryptographic SDK key/secure entity key is opaque to the untrusted intermediary entities that serve as communication intermediates positioned between the authorized recipient and the secure entity 402—since such untrusted intermediary entities do not have access to the cryptographic handshake keys that have been used to encrypt the cryptographic SDK key/secure entity key. As a result, the invention enables creating a second secure channel of communication between the secure entity 402 and the authorized recipient 406 despite the fact that data transmitted over the secure channel has to pass through one or more untrusted entities 404.

As an optional step, the authorized recipient 406 may provision one or more of the untrusted intermediary entities 404 with a trust token (for example the cryptographic second handshake key/second set of cryptographic handshake keys) that can be used to establish trust with secure entity 402. For example the authorized recipient 406 can transmit the cryptographic second handshake key/second set of cryptographic handshake keys to the untrusted intermediary 404 for storage thereon—and future communications between the secure entity 402 and the untrusted intermediary 404 can be signed or encrypted using the cryptographic second handshake key/second set of cryptographic handshake keys. Since both of the secure entity 402 and the untrusted intermediary entity 404 have access to the cryptographic second handshake key/second set of cryptographic handshake keys, each can authenticate or decrypt data that has been signed or encrypted by the other using the cryptographic second handshake key/second set of cryptographic handshake keys. By provisioning an untrusted intermediary entity 494 with a trust token in this manner, the invention enables (if necessary) generation of a secured communication channel between the secure entity 402 and the untrusted intermediary entity 404 as well.

The secure entity 402 receives the encrypted cryptographic SDK key/secure entity key (which may in an embodiment comprise a cryptographic public key of a first public-private key pair that has been generated by the authorized recipient 406) and decrypts the cryptographic SDK key/secure entity key using the cryptographic first handshake key/first set of cryptographic handshake keys.

Thereafter the secure entity/SDK generates a cryptographic transaction key (using a predefined shared secret algorithm or method that is known to both the secure entity 402 and the authorized recipient 406)—wherein generation of the cryptographic transaction key is based on (for example, may use as an input) the cryptographic SDK key/secure entity key (which may in an embodiment comprise a cryptographic public key of a first public-private key pair that has been generated by the authorized recipient 406) and may additionally be based on (for example, may use as an input) at least a first data element/first data item. In an embodiment, the first data element/first data item comprises a cryptographic private key of a second private-public key pair generated by the secure entity 402. In an embodiment the predefined shared secret algorithm may comprise any one or more key exchange algorithms such as the DH algorithm, ECDH algorithm, SIDH algorithm, ECIES algorithm, IKE algorithm or JFK algorithm.

The secure entity 402 uses the generated cryptographic transaction key to encrypt session data for transmission to the authorized recipient 406. The session data may include any personal or sensitive data that has been received by the secure entity 402 (for example through a user interface generated or controlled by said secure entity 402) for onward secure transmission to an authorized recipient 406.

At step 4014 the secure entity 402 transmits to the untrusted intermediary 404 (i) the encrypted session data, and (ii) a second data element/second data item, wherein the second data item comprises a data item that enables the authorized recipient 406 to regenerate the cryptographic transaction key (that has been independently been generated by the secure entity 402) based on at least (a) the second data item, and (b) the predefined shared secret algorithm or method that is known to both the secure entity 402 and the authorized recipient 406. In an embodiment, the second data element/second data item comprises a cryptographic public key of the second private-public key pair generated by the secure entity 402. At step 4016, the untrusted intermediary 404 transmits (i) the encrypted session data, and (ii) the second data element/second data item, onward to the authorized recipient 406.

The authorized recipient 406 receives the second data element/second data item, and regenerates the cryptographic transaction key based on at least the second data item and the predefined shared secret algorithm or method that is known to both the secure entity/SDK and the authorized recipient.

In an embodiment, where the cryptographic SDK key/secure entity key comprises a cryptographic symmetric key, the authorized recipient 406 may additionally rely on said cryptographic symmetric key for regeneration of the cryptographic transaction key. In another embodiment where the cryptographic SDK key/secure entity key comprises a cryptographic public key corresponding to a public-private key pair generated by the authorized recipient, said authorized recipient 406 may additionally rely on the cryptographic private key corresponding to said cryptographic public key for the purposes of regeneration of the cryptographic transaction key.

The authorized recipient 406 uses the regenerated cryptographic transaction key to decrypt session data received from the secure entity 402, and to encrypt session data for transmission to the secure entity 402.

It would be understood that since the unsecure intermediary entity 404 does not have access to any of the second data item, the predefined shared secret algorithm or method that is known to both the secure entity 402 and the authorized recipient 406, or to the cryptographic SDK key/secure entity key, said unsecure entity authorized recipient404 would be unable to generate the cryptographic transaction key independently and would therefore be unable to decrypt or misappropriate the encrypted session data transmitted from the secure entity 402 to the authorized recipient 406.

Since both of the secure entity 402 and the authorized recipient 406 are now in secure possession of the cryptographic transaction key, said cryptographic transaction key can be used to encrypt subsequent communications between the two entities within the communication session. This has the effect of creating a third secure channel of communication between the secure entity 402 and the authorized recipient 406 despite the fact that data transmitted over this third secure channel has to pass through one or more untrusted entities 404.

In an embodiment, on response of every successful communication or any specific time, the authorized recipient 406 can generate new cryptographic keys for generating a new cryptographic SDK key/secure entity key—which thereafter enables generation of a new transaction key.

It would be understood that shared cryptographic SDK key/secure entity keys or cryptographic transaction keys can be periodically refreshed or regenerated based on the data sensitivity of information that is exchanged between the secure entity 402 and an intended authorized entity 406. Cryptographic keys can be chosen for single use, or may be limited for use within a certain period.

Figure 5:
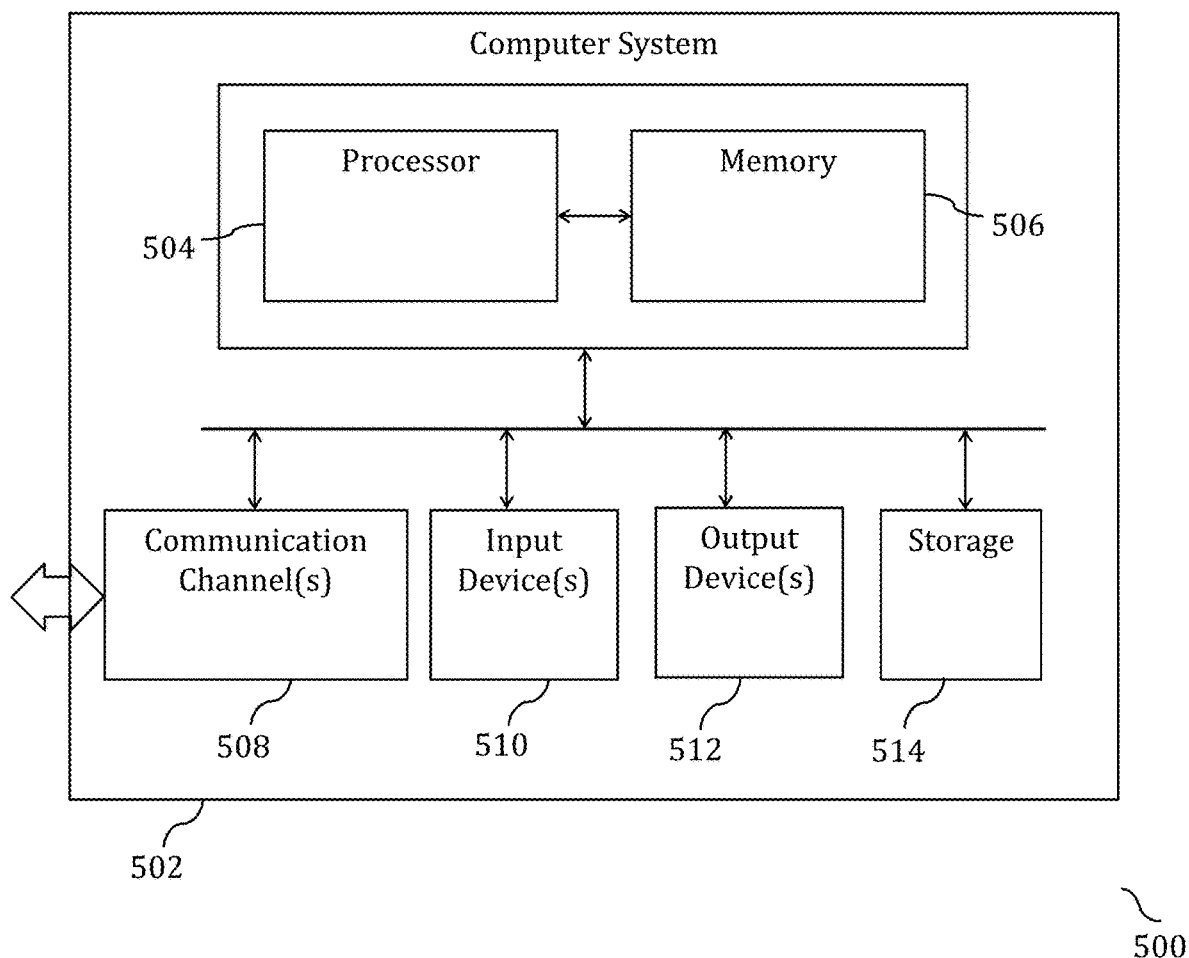
FIG. 5 illustrates an exemplary system for implementing the present invention.

FIG. 5 illustrates an exemplary system 500 for implementing the present invention. The illustrated system 500 comprises computer system 502 which in turn comprises one or more processors 504 and at least one memory 506. Processor 504 is configured to execute program instructions—and may be a real processor or a virtual processor. It will be understood that computer system 502 does not suggest any limitation as to scope of use or functionality of described embodiments. The computer system 502 may include, but is not be limited to, one or more of a general-purpose computer, a programmed microprocessor, a microcontroller, an integrated circuit, and other devices or arrangements of devices that are capable of implementing the steps that constitute the method of the present invention. Exemplary embodiments of a computer system 502 in accordance with the present invention may include one or more servers, desktops, laptops, tablets, smart phones, mobile phones, mobile communication devices, tablets, phablets and personal digital assistants. In an embodiment of the present invention, the memory 506 may store software for implementing various embodiments of the present invention. The computer system 502 may have additional components. For example, the computer system 502 may include one or more communication channels 508, one or more input devices 510, one or more output devices 512, and storage 514. An interconnection mechanism (not shown) such as a bus, controller, or network, interconnects the components of the computer system 502. In various embodiments of the present invention, operating system software (not shown) provides an operating environment for various softwares executing in the computer system 502 using a processor 504, and manages different functionalities of the components of the computer system 502.

The communication channel(s) 508 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, wireless transmission protocols such as Bluetooth (™), or other transmission media.

The input device(s) 510 may include, but is not limited to, a touch screen, a keyboard, mouse, pen, joystick, trackball, a voice device, a scanning device, or any another device that is capable of providing input to the computer system 502. In an embodiment of the present invention, the input device(s) 510 may be a sound card or similar device that accepts audio input in analog or digital form. The output device(s) 512 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 502.

The storage 514 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 502. In various embodiments of the present invention, the storage 514 may contain program instructions for implementing any of the described embodiments.

In an embodiment of the present invention, the computer system 502 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 502. The method described herein is typically implemented as a computer program product, comprising a set of program instructions that is executed by the computer system 502 or any other similar device. The set of program instructions may be a series of computer readable codes stored on a tangible medium, such as a computer readable storage medium (storage 514), for example, diskette, CD-ROM, ROM, flash drives or hard disk, or transmittable to the computer system 502, via a modem or other interface device, over either a tangible medium, including but not limited to optical or analogue communications channel(s) 508. The implementation of the invention as a computer program product may be in an intangible form using wireless techniques, including but not limited to microwave, infrared, wireless transmission protocols such as Bluetooth (™) or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

From the above description of the invention and its embodiments, it would be understood that the invention offers multiple advantages and improvements over the earlier existing state of art, including:

sensitive or personal data provided to the secure entity/ SDK is not accessible or readable by any unsecure intermediary entity (including any software applications published by an authorized recipient that is implemented within the concerned mobile device/terminal device)—and can only be accessed and read by the authorized recipient sensitive or personal data provided to the secure entity/ SDK is encrypted using keys that are known only to the secure entity/SDK and which are not accessible by or known to any unsecure intermediary entity, including any software applications that are implemented within the same mobile device/terminal device on which the secure entity/SDK operates personal or sensitive data provided by a user to the secure entity/SDK is tamper proof and is safe from local attacks originating even within the same mobile device/ terminal device since personal or sensitive data provided to the secure entity/SDK is encrypted using keys that are known only to the secure entity/SDK and which are not accessible by or known to any unsecure intermediary entity, any tampering with such encrypted data would result in corruption of the encrypted data, thereby alerting the system or a user to the attack on the encrypted data since the secure entity/SDK is configured to run within a first memory space that is different from a second memory space used by an unsecure software application that enables the secure entity/SDK to communicate with the authorized recipient, and which first memory space may be protected from access by such software application, the secure entity/SDK is further insulated from run time attacks originating from or through such unsecure software application the system and methods of the present invention additionally ensure that the recipient of a message also receives proof of origin of the message—which eliminates the possibility of a message originator subsequently denying that the message was originated/sent by it the system and methods of the present invention additionally enable the secure entity/SDK to append its digital signature to each encrypted data message to ensure non-repudiation of origin of such messages the systems and method of the present invention create session specific encryption keys which cannot be recovered and used for interception and misappropriation of encrypted data in subsequent communication sessions While the exemplary embodiments of the present invention are described and illustrated herein, it will be appreciated that they are merely illustrative. It will be understood by those skilled in the art that various modifications in form and detail may be made therein without departing from or offending the scope of the invention as defined by the appended claims. Additionally, the invention illustratively disclose herein suitably may be practiced in the absence of any element which is not specifically disclosed herein—and in a particular embodiment specifically contemplated, is intended to be practiced in the absence of any element which is not specifically disclosed herein.

I claim:

1. A method for implementing encrypted network data transmission, comprising performing at a processor implemented secure entity within a terminal device, steps of:
   receiving a request for initiating transmission of data to an authorized recipient device;
   encrypting at least a cryptographic first handshake key with a cryptographic first public key associated with the authorized recipient device;
   transmitting, over a communication network, the encrypted cryptographic first handshake key to the authorized recipient device through an untrusted intermediary, wherein the untrusted intermediary is an untrusted intermediary device or a device implemented untrusted intermediary software application;
   receiving, over the communication network, an encrypted cryptographic secure entity key generated and transmitted by the authorized recipient device through the untrusted intermediary, wherein generation of the encrypted cryptographic secure entity key comprises;
   performing at the authorized recipient device, the steps of:
      receiving the encrypted cryptographic first handshake key;
      decrypting the encrypted cryptographic first handshake key with a cryptographic first private key associated with the authorized recipient device, wherein the cryptographic first public key and the cryptographic first private key comprise a cryptographic first asymmetric key pair; and
      encrypting a cryptographic secure entity key with the cryptographic first handshake key to generate the encrypted cryptographic secure entity key;
   decrypting the encrypted cryptographic secure entity key with the cryptographic first handshake key;
   generating a cryptographic transaction key, wherein the cryptographic transaction key is generated based on:
      a shared secret key generation process;
      the cryptographic secure entity key that has been received from the authorized recipient device through the untrusted intermediary; and
      a cryptographic second private key associated with the secure entity;
   encrypting session data with the generated cryptographic transaction key; and
   transmitting, over the communication network, the encrypted session data and a cryptographic second public key associated with the secure entity to the authorized recipient device through the untrusted intermediary, wherein the cryptographic second private key and the cryptographic second public key comprise a cryptographic second asymmetric key pair.

2. The method as claimed in claim 1, wherein the authorized recipient device, implemented by at least one processor, is configured for:
   receiving the encrypted session data and the cryptographic second public key;
   generating the cryptographic transaction key, wherein generating the cryptographic transaction key is based on:
      the shared secret key generation process;
      the cryptographic second public key; and
      (i) the cryptographic secure entity key, when said cryptographic secure entity key is a cryptographic symmetric key, or (ii) a cryptographic third private key, when the cryptographic secure entity key comprises a public key of an asymmetric public-private keypair, wherein the cryptographic third private key comprises the private key of the asymmetric public-private key pair; and
   decrypting the received encrypted session data with the cryptographic transaction key.

3. The method as claimed in claim 2, wherein the processor implemented secure entity:
   receives encrypted session data that:
      has been encrypted by the authorized recipient device with the cryptographic transaction key; and
      has been transmitted to the secure entity through the untrusted intermediary; and
   decrypts the encrypted session data received from the authorized recipient device with the cryptographic transaction key.

4. The method as claimed in claim 1, comprising:
   encrypting at least a cryptographic second handshake key with the cryptographic first public key;
   transmitting the encrypted cryptographic second handshake key to the authorized recipient device through the untrusted intermediary, wherein the authorized recipient device, implemented by at least one processor, is configured for:
      receiving the encrypted cryptographic second handshake key;
      decrypting the encrypted cryptographic second handshake key with the cryptographic first private key; and
      transmitting the cryptographic second handshake key to the untrusted intermediary for storage therein and for signing, encryption or decryption of data messages transmitted between the secure entity and the untrusted intermediary.

5. A method for encrypting network data transmission, comprising performing at a processor implemented authorized recipient of data, steps of:
receiving from a secure entity within a terminal device, over a communication network, an encrypted cryptographic first handshake key, wherein:
the encrypted cryptographic first handshake key has been generated at the secure entity by encrypting a cryptographic first handshake key with a cryptographic first public key associated with the authorized recipient; and
the encrypted cryptographic first handshake key has been transmitted to the authorized recipient from the secure entity through an untrusted intermediary, wherein the untrusted intermediary is an untrusted intermediary device or a device implemented untrusted intermediary software application;
decrypting the encrypted cryptographic first handshake key with a cryptographic first private key associated with the authorized recipient, wherein the cryptographic first public key and the cryptographic first private key comprise a cryptographic first asymmetric key pair;
encrypting a cryptographic secure entity key with the cryptographic first handshake key to generate an encrypted cryptographic secure entity key;
transmitting, over the communication network, the encrypted cryptographic secure entity key to the secure entity through the untrusted intermediary;
receiving from the secure entity, over the communication network, encrypted session data and a cryptographic second public key associated with the secure entity through the untrusted intermediary, wherein:
the secure entity has:
decrypted the encrypted cryptographic secure entity key with the cryptographic first handshake key;
generated a cryptographic transaction key, wherein the cryptographic transaction key is generated based on:
a shared secret key generation process;
the cryptographic secure entity key that has been received from the authorized recipient through the untrusted intermediary; and
a cryptographic second private key associated with the secure entity; and
encrypted session data with the generated cryptographic transaction key; and
the cryptographic second private key and the cryptographic second public key comprise a cryptographic second asymmetric key pair.

6. The method as claimed in claim 5, wherein the authorized recipient performs the steps of:
generating the cryptographic transaction key, wherein generating the cryptographic transaction key is based on:
the shared secret key generation process;
the cryptographic second public key; and
(i) the cryptographic secure entity key, when said cryptographic secure entity key is a cryptographic symmetric key, or (ii) a cryptographic third private key, when the cryptographic secure entity key comprises a public key of an asymmetric public-private keypair, wherein the cryptographic third private key comprises the private key of the asymmetric public-private key pair; and decrypting the received encrypted session data with the cryptographic transaction key.

7. The method as claimed in claim 6, wherein the secure entity:
receives encrypted session data that:
has been encrypted by the authorized recipient with the cryptographic transaction key; and
has been transmitted to the secure entity through the untrusted intermediary; and
decrypts the encrypted session data received from the authorized recipient with the cryptographic transaction key.

8. The method as claimed in claim 5, comprising:
receiving from the secure entity, an encrypted cryptographic second handshake key that has been encrypted with the cryptographic first public key;
decrypting the encrypted cryptographic second handshake key with the cryptographic first private key; and
transmitting the cryptographic second handshake key to the untrusted intermediary for storage therein and for signing, encryption or decryption of data messages transmitted between the secure entity and the untrusted intermediary.

9. A system for implementing encrypted network data transmission, comprising;
a memory; and
a processor implemented secure entity within a terminal device, wherein the processor implemented secure entity is configured to perform steps of:
receiving a request for initiating transmission of data to an authorized recipient device;
encrypting at least a cryptographic first handshake key with a cryptographic first public key associated with the authorized recipient device;
transmitting, over a communication network, the encrypted cryptographic first handshake key to the authorized recipient device through an untrusted intermediary, wherein the untrusted intermediary is an untrusted intermediary device or a device implemented untrusted intermediary software application;
receiving, over the communication network, an encrypted cryptographic secure entity key generated and transmitted by the authorized recipient device through the untrusted intermediary, wherein generation of the encrypted cryptographic secure entity key comprises:
performing at the authorized recipient device, implemented by at least one processor, the steps of:
receiving the encrypted cryptographic first handshake key;
decrypting the encrypted cryptographic first handshake key with a cryptographic first private key associated with the authorized recipient device, wherein the cryptographic first public key and the cryptographic first private key comprise a cryptographic first asymmetric key pair; and
encrypting a cryptographic secure entity key with the cryptographic first handshake key to generate the encrypted cryptographic secure entity key;
decrypting the encrypted cryptographic secure entity key with the cryptographic first handshake key;
generating a cryptographic transaction key, wherein the cryptographic transaction key is generated based on:
a shared secret key generation process;
the cryptographic secure entity key that has been received from the authorized recipient device through the untrusted intermediary; and a cryptographic second private key associated with the secure entity;
encrypting session data with the generated cryptographic transaction key; and
transmitting, over the communication network, the encrypted session data and a cryptographic second public key associated with the secure entity to the authorized recipient device through the untrusted intermediary, wherein the cryptographic second private key and the cryptographic second public key comprise a cryptographic second asymmetric key pair.

10. The system as claimed in claim 9, wherein the authorized recipient device, implemented by the at least one processor, is configured for:
receiving the encrypted session data and the cryptographic second public key;
generating the cryptographic transaction key, wherein generating the cryptographic transaction key is based on:
the shared secret key generation process;
the cryptographic second public key; and
(i) the cryptographic secure entity key, when said cryptographic secure entity key is a cryptographic symmetric key, or (ii) a cryptographic third private key, when the cryptographic secure entity key comprises a public key of an asymmetric public-private keypair, wherein the cryptographic third private key comprises the private key of the asymmetric public-private key pair; and
decrypting the received encrypted session data with the cryptographic transaction key.

11. The system as claimed in claim 10, wherein the processor implemented secure entity is configured for:
receiving encrypted session data that:
has been encrypted by the authorized recipient device with the cryptographic transaction key; and
has been transmitted to the secure entity through the untrusted intermediary; and
decrypting the encrypted session data received from the authorized recipient device with the cryptographic transaction key.

12. The system as claimed in claim 9, wherein the processor implemented secure entity is configured for:
encrypting at least a cryptographic second handshake key with the cryptographic first public key;
transmitting the encrypted cryptographic second handshake key to the authorized recipient device through the untrusted intermediary, wherein the authorized recipient device, implemented by the at least one processor, is configured for:
receiving the encrypted cryptographic second handshake key;
decrypting the encrypted cryptographic second handshake key with the cryptographic first private key; and
transmitting the cryptographic second handshake key to the untrusted intermediary for storage therein and for signing, encryption or decryption of data messages transmitted between the secure entity and the untrusted intermediary.

13. A system for implementing encrypted network data transmission, comprising;
a memory; and
a processor implemented authorized recipient of data, wherein the processor implemented authorized recipient of data is configured to perform steps of:
receiving from a secure entity within a terminal device, over a communication network, an encrypted cryptographic first handshake key, wherein:
the encrypted cryptographic first handshake key has been generated at the secure entity by encrypting a cryptographic first handshake key with a cryptographic first public key associated with the authorized recipient; and
the encrypted cryptographic first handshake key has been transmitted to the authorized recipient from the secure entity through an untrusted intermediary, wherein the untrusted intermediary is an untrusted intermediary device or a device implemented untrusted intermediary software application;
decrypting the encrypted cryptographic first handshake key with a cryptographic first private key associated with the authorized recipient, wherein the cryptographic first public key and the cryptographic first private key comprise a cryptographic first asymmetric key pair;
encrypting a cryptographic secure entity key with the cryptographic first handshake key to generate an encrypted cryptographic secure entity key;
transmitting, over the communication network, the encrypted cryptographic secure entity key to the secure entity through the untrusted intermediary;
receiving from the secure entity, over the communication network, encrypted session data and a cryptographic second public key associated with the secure entity through the untrusted intermediary, wherein:
the secure entity, implemented by at least one processor, has:
decrypted the encrypted cryptographic secure entity key with the cryptographic first handshake key;
generated a cryptographic transaction key, wherein the cryptographic transaction key is generated based on:
a shared secret key generation process;
the cryptographic secure entity key that has been received from the authorized recipient through the untrusted intermediary; and
a cryptographic second private key associated with the secure entity; and
encrypted session data with the generated cryptographic transaction key; and
the cryptographic second private key and the cryptographic second public key comprise a cryptographic second asymmetric key pair.

14. The system as claimed in claim 13, wherein the processor implemented authorized recipient is configured to perform the steps of:
generating the cryptographic transaction key, wherein generating the cryptographic transaction key is based on:
the shared secret key generation process;
the cryptographic second public key; and
(i) the cryptographic secure entity key, when said cryptographic secure entity key is a cryptographic symmetric key, or (ii) a cryptographic third private key, when the cryptographic secure entity key comprises a public key of an asymmetric public-private keypair, wherein the cryptographic third private key comprises the private key of the asymmetric public-private key pair; and
decrypting the received encrypted session data with the cryptographic transaction key.

15. The system as claimed in claim 14, wherein the secure entity, implemented by the at least one processor, is configured to:
receive encrypted session data that:
has been encrypted by the authorized recipient with the cryptographic transaction key; and
has been transmitted to the secure entity through the untrusted intermediary; and
decrypt the encrypted session data received from the authorized recipient with the cryptographic transaction key.

16. The system as claimed in claim 13, wherein the processor implemented authorized recipient is configured to perform the steps of:
receiving from the secure entity, an encrypted cryptographic second handshake key that has been encrypted with the cryptographic first public key;
decrypting the encrypted cryptographic second handshake key with the cryptographic first private key; and
transmitting the cryptographic second handshake key to the untrusted intermediary for storage therein and for signing, encryption or decryption of data messages transmitted between the secure entity and the untrusted intermediary.

17. A computer program product for implementing encrypted network data transmission, comprising a non-transitory computer readable medium having a computer readable program code embodied therein, the computer readable program code comprising instructions for performing at a processor implemented secure entity within a terminal device, steps of:
receiving a request for initiating transmission of data to an authorized recipient device;
encrypting at least a cryptographic first handshake key with a cryptographic first public key associated with the authorized recipient device;
transmitting, over a communication network, the encrypted cryptographic first handshake key to the authorized recipient device through an untrusted intermediary, wherein the untrusted intermediary is an untrusted intermediary device or a device implemented untrusted intermediary software application;
receiving, over the communication network, an encrypted cryptographic secure entity key generated and transmitted by the authorized recipient device through the untrusted intermediary, wherein generation of the encrypted cryptographic secure entity key comprises:
performing at the authorized recipient device, implemented by at least one processor, the steps of:
receiving the encrypted cryptographic first handshake key;
decrypting the encrypted cryptographic first handshake key with a cryptographic first private key associated with the authorized recipient device, wherein the cryptographic first public key and the cryptographic first private key comprise a cryptographic first asymmetric key pair; and
encrypting a cryptographic secure entity key with the cryptographic first handshake key to generate the encrypted cryptographic secure entity key;
decrypting the encrypted cryptographic secure entity key with the cryptographic first handshake key;
generating a cryptographic transaction key, wherein the cryptographic transaction key is generated based on:
a shared secret key generation process;
the cryptographic secure entity key that has been received from the authorized recipient device through the untrusted intermediary; and
a cryptographic second private key associated with the secure entity;
encrypting session data with the generated cryptographic transaction key; and
transmitting, over the communication network, the encrypted session data and a cryptographic second public key associated with the secure entity to the authorized recipient device through the untrusted intermediary, wherein the cryptographic second private key and the cryptographic second public key comprise a cryptographic second asymmetric key pair.

18. A computer program product for implementing encrypted network data transmission, comprising a non-transitory computer readable medium having a computer readable program code embodied therein, the computer readable program code comprising instructions for performing at a processor implemented authorized recipient of data, steps of:
receiving from a secure entity within a terminal device, over a communication network, an encrypted cryptographic first handshake key, wherein:
the encrypted cryptographic first handshake key has been generated at the secure entity by encrypting a cryptographic first handshake key with a cryptographic first public key associated with the authorized recipient; and
the encrypted cryptographic first handshake key has been transmitted to the authorized recipient from the secure entity through an untrusted intermediary, wherein the untrusted intermediary is an untrusted intermediary device or a device implemented untrusted intermediary software application;
decrypting the encrypted cryptographic first handshake key with a cryptographic first private key associated with the authorized recipient, wherein the cryptographic first public key and the cryptographic first private key comprise a cryptographic first asymmetric key pair;
encrypting a cryptographic secure entity key with the cryptographic first handshake key to generate an encrypted cryptographic secure entity key;
transmitting, over the communication network, the encrypted cryptographic secure entity key to the secure entity through the untrusted intermediary;
receiving from the secure entity, over the communication network, encrypted session data and a cryptographic second public key associated with the secure entity through the untrusted intermediary, wherein:
the secure entity, implemented by at least one processor, has:
decrypted the encrypted cryptographic secure entity key with the cryptographic first handshake key;
generated a cryptographic transaction key, wherein the cryptographic transaction key is generated based on:
a shared secret key generation process;
the cryptographic secure entity key that has been received from the authorized recipient through the untrusted intermediary; and
a cryptographic second private key associated with the secure entity; and
encrypted session data with the generated cryptographic transaction key; and the cryptographic second private key and the cryptographic second public key comprise a cryptographic second asymmetric key pair.

\* \* \* \* \*